United States Patent
Cheng et al.

(10) Patent No.: US 7,499,434 B2
(45) Date of Patent: Mar. 3, 2009

(54) MAPPING UPLINK SIGNALING CHANNELS

(75) Inventors: Fang-Chen Cheng, Randolph, NJ (US); James P. Seymour, Lisle, IL (US); Lei Song, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 378 days.

(21) Appl. No.: 11/211,166

(22) Filed: Aug. 24, 2005

(65) Prior Publication Data

US 2007/0047576 A1 Mar. 1, 2007

(51) Int. Cl.
*H04J 3/00* (2006.01)
(52) U.S. Cl. .................... 370/336; 455/442; 370/335
(58) Field of Classification Search .............. None
See application file for complete search history.

(56) References Cited

U.S. PATENT DOCUMENTS

| | | | |
|---|---|---|---|
| 4,850,030 A * | 7/1989 | Hashimoto et al. .......... | 455/516 |
| 6,393,286 B1 * | 5/2002 | Svensson .................... | 455/437 |
| 6,608,832 B2 * | 8/2003 | Forslow ...................... | 370/353 |
| 2007/0115871 A1 * | 5/2007 | Zhang et al. ................ | 370/318 |

FOREIGN PATENT DOCUMENTS

WO WO2005078965 * 8/2005

* cited by examiner

*Primary Examiner*—Nick Corsaro
*Assistant Examiner*—Vladimir Magloire

(57) ABSTRACT

The present invention provides a method of wireless communication involving at least one first uplink channel associated with a first protocol and at least one second uplink channel associated with a second protocol. The method may include providing signaling information associated with the first uplink channel over a signaling channel associated with the at least one second uplink channel in response to determining that the signaling channel associated with the at least one second uplink channel is available.

13 Claims, 4 Drawing Sheets

MAPPING UPLINK SIGNALING CHANNELS

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs, for providing wireless connectivity to one or more mobile units, which may also be referred to using terms such as user equipment, subscriber equipment, and access terminals. Exemplary mobile units include cellular telephones, personal data assistants, smart phones, text messaging devices, laptop computers, desktop computers, and the like. Each base station may provide wireless connectivity to one or more mobile units in a geographical area, or cell, associated with the base station. For example, a base station that operates according to a Universal Mobile Telecommunication System (UMTS) protocol may provide wireless connectivity to one or more mobile units in a cell associated with the base station over a wireless communication link.

Wireless communication links typically include one or more uplink channels and one or more downlink channels. A mobile unit may transmit voice and/or data information to the base station over the uplink channel. For example, the mobile unit may transmit voice and/or data information over a data channel (e.g., a dedicated physical data channel, DPDCH). The mobile unit may also transmit control information associated with the voice and/or data information over a control channel (e.g., a dedicated physical control channel, DPCCH). For example, the mobile unit may transmit transport format combination information (TFCI) in a TFCI field of the control channel. Release 6 of the Third Generation Partnership Project (3GPP) standard for UMTS defines an enhanced data channel feature (E-DCH) that is designed to increase the uplink system capacity. The E-DCH feature has tighter control of the overall received rise of thermal (RoT) and introduces hybrid automatic repeat request (HARQ) technology. The HARQ allows mobile units to aggressively take advantage of a fading channel by implementing physical layer retransmission and soft combining at a turbo decoder in the base station. An enhanced control channel (e.g., an enhanced dedicated physical control channel, E-DPCCH) is introduced to transmit control information associated with the enhanced data channel. For example, the control channel may transmit E-TFCI information and/or HARQ Retransmission Sequence Number (RSN) information. In system capacity performance analyses, the E-DPCCH channel represents overhead and is a negative factor that may reduce system capacity.

FIG. 1 conceptually illustrates a conventional wireless communication system 100 that includes one or more data channels 105 and an enhanced data channel 107. In the illustrated embodiment, one or more data channels 105 may be used to transmit voice and/or data information according to the 3GPP '99 standard. The data channels 105 provide voice and/or data information to a coder and/or multiplexer 110, which encodes and/or multiplexes the information and provides the encoded and/or multiplexed information to a demultiplexer and/or splitter 120 over a control channel 125 (e.g., a coded composite transport channel, CCTrCH). The encoded and/or multiplexed information transmitted over the control channel 125 may also include signaling information. The demultiplexer and/or splitter 120 may then demultiplex and/or split the received information and provide it to one or more physical channels 130 for transmission over an air interface. Signaling information such as transmit power control (TPC) information and/or TFCI information may be transmitted over a signaling channel 135. Signaling information for the HARQ protocol, such as acknowledgment/negative-acknowledgment (ACK/NAK) bits and/or channel quality information (CQI) may be transmitted over a signaling channel 140.

The enhanced data channel 107 may be used to transmit voice and/or data information according to Release 6 of the 3GPP standard. The enhanced data channel 107 provides voice and/or data information to a coder and/or multiplexer 145, which encodes and/or multiplexes the information and provides the encoded and/or multiplexed information to a demultiplexer and/or splitter 150 over a control channel 155 (e.g., a CCTrCH). The encoded and/or multiplexed information transmitted over the control channel 155 may also include signaling information. The demultiplexer and/or splitter 150 may then demultiplex and/or split the received information and provide it to one or more physical channels 160 for transmission over an air interface.

Release 6 of the 3GPP requires one coded composite transport channel (CCTrCH) for the data channels 105 and another CCTrCH for the enhanced data channel 107. Thus, enhanced TFCI information for the enhanced data channel 107 is provided over a signaling channel 165 (e.g., an E-DPCCH channel). The signaling channel 165 also carries the RSN information for the HARQ operation. Since the E-DCH feature is designed to increase the efficiency of the radio resource utilization and the system capacity, the usage of the DCH is envisioned to greatly decrease. For example, voice-over-Internet-Protocol (VoIP) and/or streaming services may be provided over E-DCH and so the E-DCH may be better suited to carry some or all of the traffic that is conventionally carried by the DCH.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for wireless communication involving at least one first uplink channel associated with a first protocol and at least one second uplink channel associated with a second protocol. The method may include providing signaling information associated with the first uplink channel over a signaling channel associated with the at least one second uplink channel in response to determining that the signaling channel associated with the at least one second uplink channel is available.

In another embodiment of the present invention, a method is provided for wireless communication involving at least one first uplink channel associated with a first protocol and at least one second uplink channel associated with a second protocol. The method may include receiving signaling information associated with the first uplink channel over a signaling channel associated with the at least one second uplink channel in response to determining that the signaling channel associated with the at least one second uplink channel is available.

BRIEF DESCRIPTION OF THE DRAWINGS

The invention may be understood by reference to the following description taken in conjunction with the accompanying drawings, in which like reference numerals identify like elements, and in which.

Figure 1:
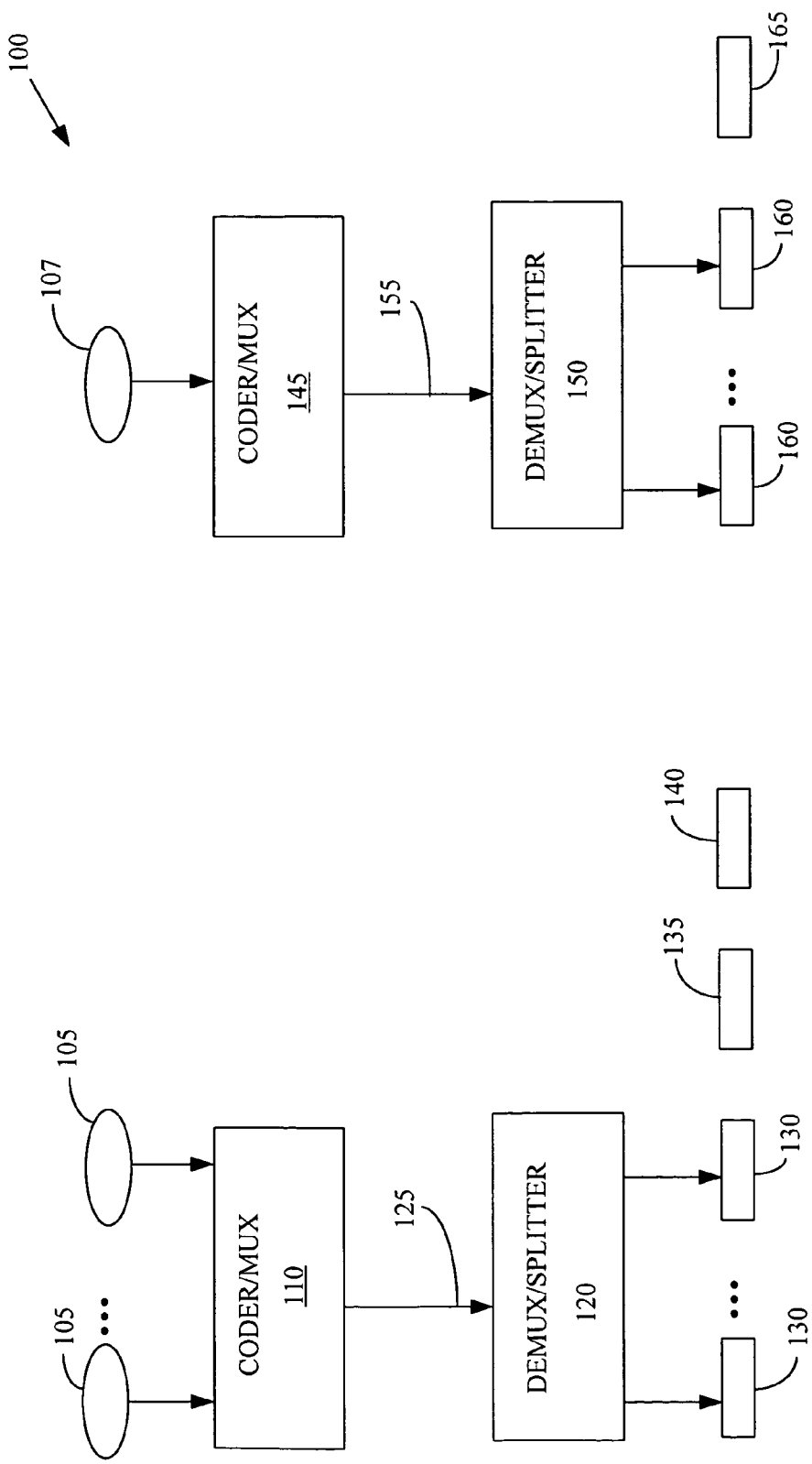
FIG. 1 conceptually illustrates a conventional wireless communication system that includes one or more data channels and an enhanced data channel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
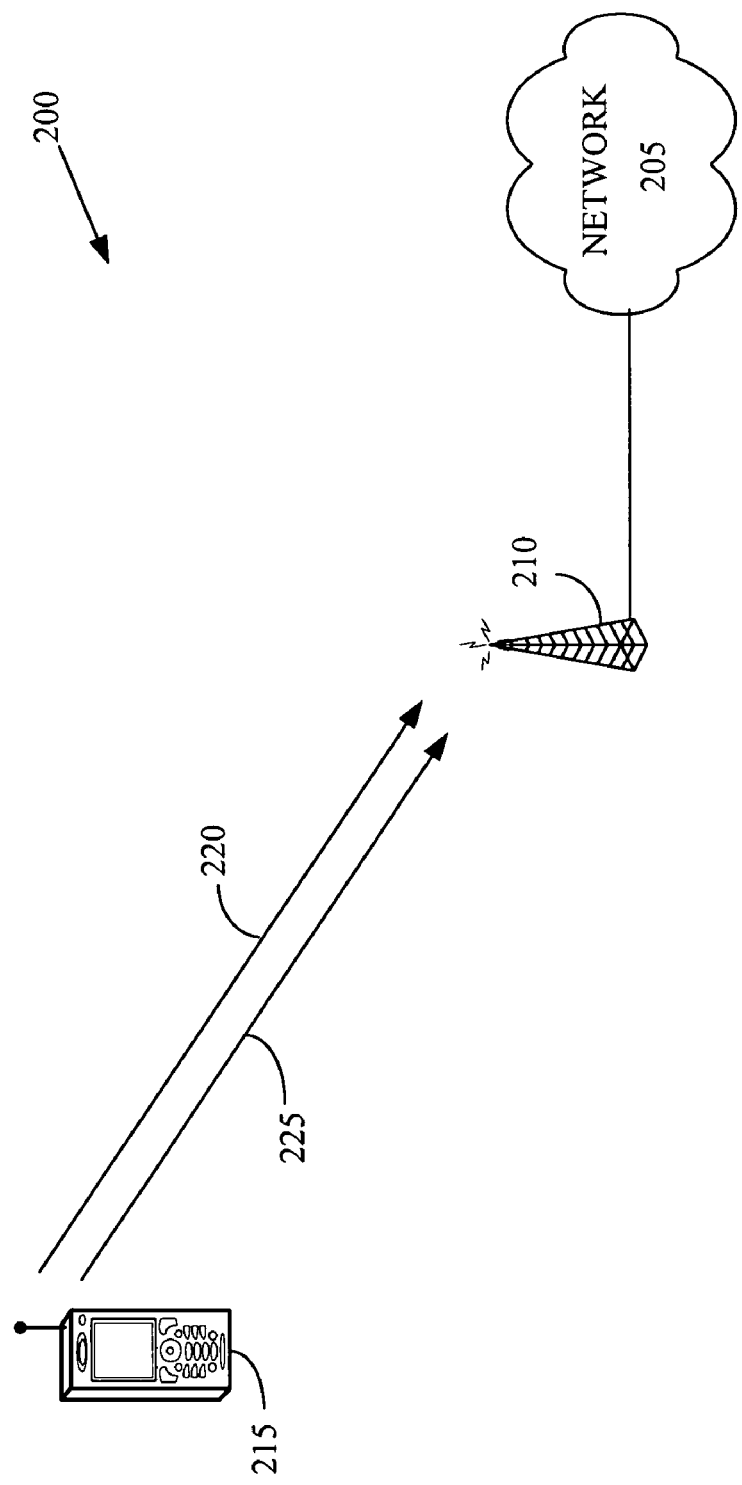
FIG. 2 conceptually illustrates one exemplary embodiment of a communication system, in accordance with the present invention.

FIG. 2 conceptually illustrates one exemplary embodiment of a communication system 200. In the illustrated embodiment, the communication system 200 includes a wireless network 205 that is communicatively coupled to a base station 210. However, persons of ordinary skill in the art having benefit of the present disclosure should appreciate that the wireless network 205 may be coupled to any number of base stations 210. Although the present invention will be discussed below in the context of the wireless network 205, persons of ordinary skill in the art having benefit of the present disclosure should also appreciate the present invention is not limited to the wireless network 105. In alternative embodiments, the network 205 may be any wired network, wireless network, or combination thereof.

The base station 210 provides wireless connectivity according to one or more wireless communication protocols. In the illustrated embodiment, the base station 210 provides wireless connectivity according to a Universal Mobile Telecommunication Systems (UMTS) 3GPP '99 protocol and Release 6 of the 3GPP protocol. However, persons of ordinary skill in the art having benefit of the present disclosure should appreciate that the present invention is not limited to these exemplary wireless communication systems. In alternative embodiments any wireless communication system may be used to provide wireless connectivity. Exemplary wireless communication systems include a Global System for Mobile communications (GSM), a Code Division Multiple Access (CDMA or CDMA 2000) system, an Evolution, Data Only (EVDO) system, an IEEE 802.16 system, a Bluetooth system, and the like. Furthermore, the wireless network 205 and/or the base station 210 may, in alternative embodiments, include wired connections that operate according to one or more wired communication protocols.

The communication system 200 includes one or more mobile units 215. Exemplary mobile units 215 include, but are not limited to, mobile phones, personal data assistants, smart phones, text messaging devices, laptop computers, desktop computers, and the like. In the interest of clarity, only one mobile unit 215 is shown in FIG. 2. However, persons of ordinary skill in the art having benefit of the present disclosure should appreciate that the communication system 200 may include any number of mobile units 215. The mobile units 215 may form wireless communication links with the wireless network 205 over air interfaces that may include first and second uplink channels 220, 225. In the illustrated embodiment, the first and second uplink channels 220, 225 operate according to first and second protocols, respectively. For example, the first uplink channel 220 may operate according to the UMTS 3GPP '99 protocol and the second uplink channel 225 may operate according to Release 6 of the 3GPP protocol.

In operation, the mobile unit 215 may transmit voice, data, and/or signaling information over the first and/or second uplink channels 220, 225. However, the mobile unit 215 may not always be using both the first and the second uplink channels 220, 225. For example, the first uplink channel 220 may be idle while the mobile unit 215 is using the second uplink channel 225 to transmit voice and/or data information. The mobile unit 215 may therefore map a signaling channel associated with the second uplink channel 225 to a signaling channel associated with the (idle) first uplink channel 220. The mobile unit 215 may then provide signaling information the signaling channel associated with the first uplink channel. The base station 210 may receive the signaling information over the signaling channel associated with the first uplink channel 220 and may use this information to decode and/or demultiplex the information received from the mobile unit 215 over a data channel of the second uplink channel 225.

Figure 3:
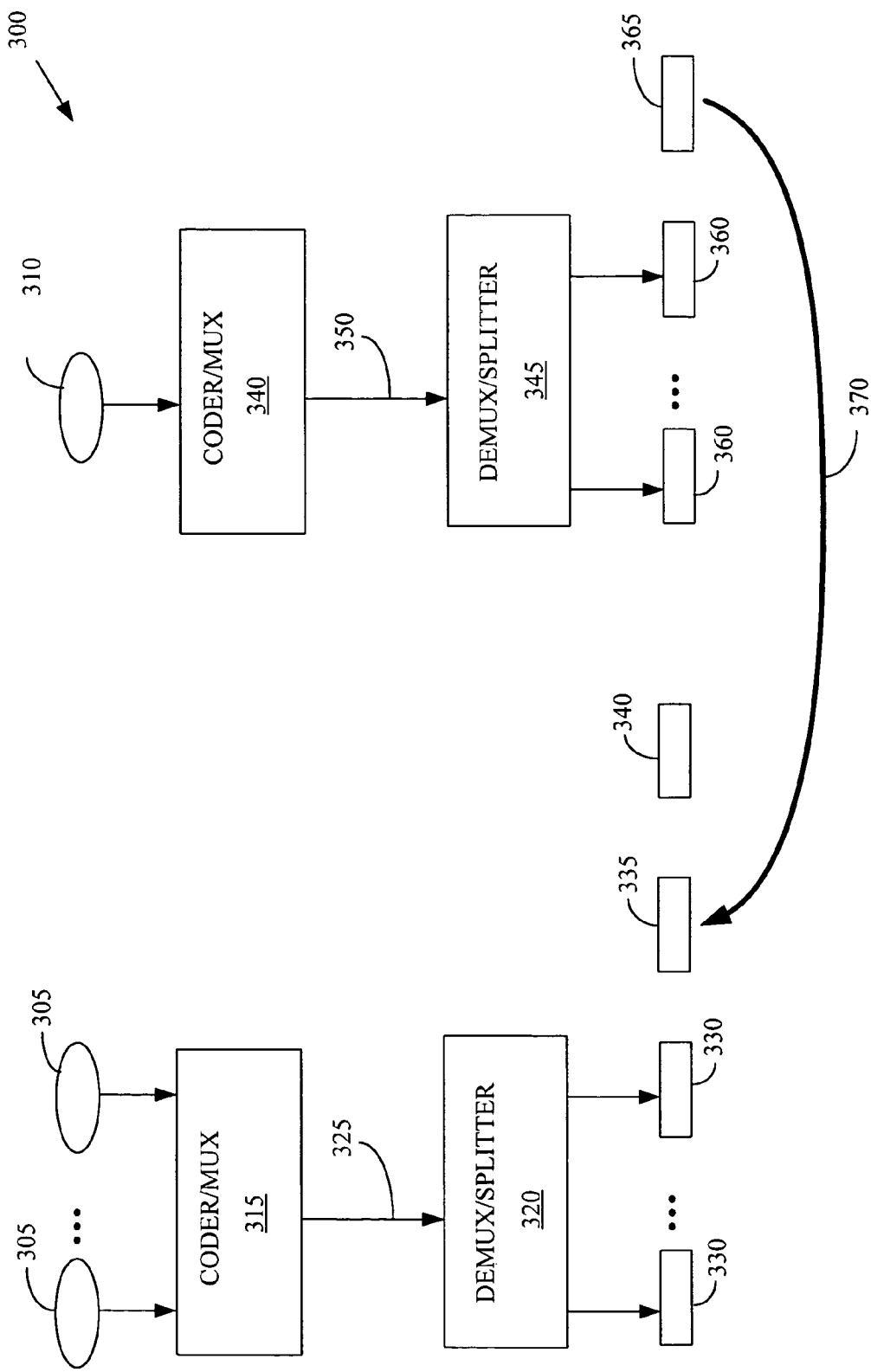
FIG. 3 conceptually illustrates one exemplary embodiment of a wireless communication system including a first uplink channel and a second uplink channel, in accordance with the present invention.

FIG. 3 conceptually illustrates one exemplary embodiment of a wireless communication system 300 including a first uplink channel 305 and a second uplink channel 310. In the illustrated embodiment, the first uplink channel 305 is an uplink data channel 305 that operates according to the 3GPP '99 protocol and the second uplink channel 310 is an enhanced uplink data channel that operates according to Release 6 of the 3GPP protocol. However, persons of ordinary skill in the art having benefit of the present disclosure should appreciate that the present invention is not limited to first and second uplink channels 305, 310 that operate according to the 3GPP '99 protocol and Release 6 of the 3GPP protocol, respectively. In alternative embodiments, the first and second uplink channels 305, 310 may operate according to any first and second protocols.

In the illustrated embodiment, the first uplink channel(s) 305 may be used to transmit voice and/or data information according to the 3GPP '99 standard. The first uplink channel(s) 305 may provide voice and/or data information to a coder and/or multiplexer 315, which encodes and/or multiplexes the information and provides the encoded and/or multiplexed information to a demultiplexer and/or splitter 320 over a control channel 325 (e.g., a first CCTrCH). The encoded and/or multiplexed information transmitted over the control channel 325 may also include signaling information. The demultiplexer and/or splitter 320 may then demultiplex and/or split the received information and provide it to one or more physical channels 330 for transmission over an air interface. Signaling information such as transmit power control (TPC) bits and/or TFCI bits may be transmitted over a signaling channel 335 and signaling information such as acknowledgment/negative acknowledgment (ACK/NAK) bits and/or channel quality information (CQI) may be transmitted over a signaling channel 340.

The second uplink channel 310 may be used to transmit voice and/or data information according to Release 6 of the 3GPP standard. The second uplink channel 310 provides voice and/or data information to a coder and/or multiplexer 345, which encodes and/or multiplexes the information and provides the encoded and/or multiplexed information to a demultiplexer and/or splitter 350 over a control channel 355 (e.g., a CCTrCH). The encoded and/or multiplexed information transmitted over the control channel 355 may also include signaling information. The demultiplexer and/or splitter 350 may then demultiplex and/or split the received information and provide it to one or more physical channels 360 for transmission over an air interface. TFCI information for the second uplink channel 310 may be provided over a signaling channel 365 (e.g., an E-DPCCH channel). The signaling channel 365 may also carry the RSN and/or other information for the HARQ operation. In one embodiment, the channel coding method for the E-DPCCH may be the same as that for the TFCI field used by the signaling channel 335. For example, the channel coding method for the E-DPCCH may be a (10, 32) Reed-Muller code.

The first and second uplink channels 305, 310 may transmit voice, data, and/or signaling information concurrently. However, in some embodiments, the first uplink channel 305 may be idle. Accordingly, the signaling channel 365 associated with the second uplink channel 310 may be mapped to the signaling channel 335 associated with the (idle) first uplink channel 305, as indicated by the arrow 370. Signaling information associated with voice and/or data that is transmitted over the second uplink channel may then be provided over the signaling channel 335 associated with the (idle) first uplink channel. The signaling channel 365 associated with the second uplink channel 310 may be released and used for other purposes. Consequently, the overhead associated with the first and second uplink channels 305, 310 may be reduced by mapping the signaling channel 365 to the signaling channel 335.

In the illustrated embodiment, the first and second uplink channels 305, 310 operate according to the 3GPP '99 protocol and Release 6 of the 3GPP protocol, respectively, as discussed above. Accordingly, when the first uplink channel 305 is idle, a single E-DCH CCTrCH 350 may be operative and the DCH CCTrCH 325 may not be operative. All the logic channels may then be mapped into the E-DCH CCTrCH 350, which may provide control information such as an E-TFCI to indicate the transport format combination information set and an RSN for the HARQ operation associated with the transmitted information. Since the DCH CCTrCH 325 is not supported when the first uplink channels 305 are idle, the TFCI field in the uplink DPCCH, which is conventionally reserved for the indication of DCH transport format combination set, contains the zero transport format set only (e.g., the transport format combination set indicates that there is no DCH transport channel 305). Moreover, the TFCI field in the UL DPCCH transmits all the time. Accordingly, a 10-bit 10 ms transmit time interval (TTI) E-TFCI and/or RSN information may be mapped into the TFCI field of the signaling channel 335. Since the E-TFCI and RSN information is mapped to the TFCI field in the signaling channel 335 (e.g., the DPCCH), the E-DPCCH channel 365 that is to carry the E-TFCI and RSN information when the data channel 305 is active can be completely removed. The capacity of the uplink E-DCH system 300 may then be improved by around 15% with the removal of the E-DPCCH channel 365 when the data channel 335 is idle.

In various embodiments, mapping of the signaling channel 365 to the signaling channel 335 may include other mapping operations. In on embodiment, Signaling Radio Bearer (SBR) DCCH logic channels may be mapped to an E-DCH transport channel in the Call Setup and Reconfiguration signaling procedure. The UU and Iub/Iur signaling protocols may also need to define information elements in the Node-B Application Part (NBAP) protocol and a Radio Resource Control (RRC) signaling protocol associated with mapping of the signaling channel 365 to the signaling channel 335. In one embodiment, a Medium Access Control (MAC-E) protocol may be modified to support E-DCH CCTrCH schemes for mapping of MAC-d flows to transport channel mapping. The physical channel mapping may be enhanced to support mapping of the E-TFCI and RSN information to the TFCI field in the DPCCH when the first uplink channel 305 is idle.

Figure 4:
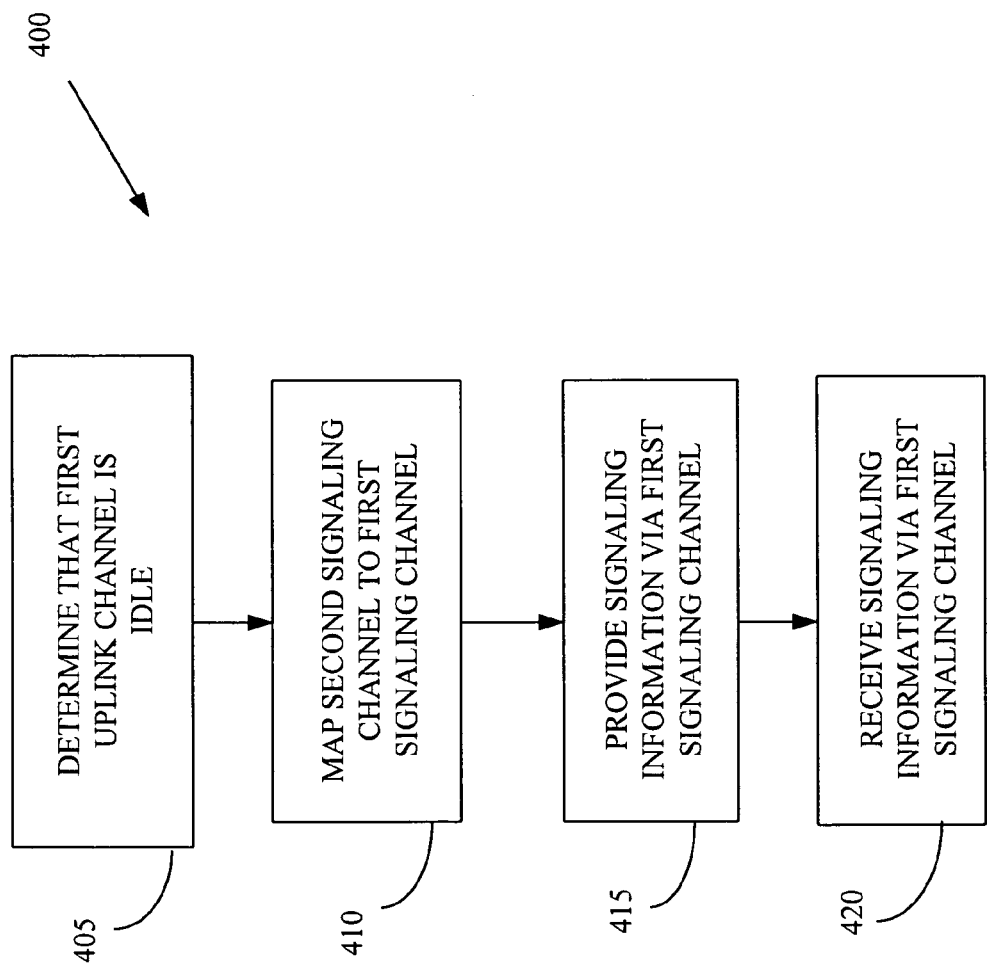
FIG. 4 conceptually illustrates one exemplary embodiment of a method of mapping uplink signaling channels, in accordance with the present invention.

FIG. 4 conceptually illustrates one exemplary embodiment of a method 400 of mapping uplink signaling channels. In the illustrated embodiment, a mobile unit is in communication with a base station over first and second uplink channels that operate according to first and second protocols, respectively. Whether or not the first uplink channel is idle may be determined (at 405). In one embodiment, the mobile unit may determine (at 405) whether or not the first uplink channel is idle. In another embodiment, which may be practiced in place of or in addition to the previous embodiment, the base station may determine (at 405) whether or not the first uplink channel is idle. If the first uplink channel is determined (at 405) to be idle, and one or more signaling channels associated with a second uplink channel may be mapped (at 410) to one or more signaling channels associated with the idle first uplink channel, as discussed in detail above.

The mobile unit may then provide (at 415) signaling information associated with transmissions over the second uplink channel using the one or more signaling channels associated with the first uplink channel. As discussed above, the signaling information may include transmission power control information, transport combination format information, information associated with a HARQ technique, and the like. The signaling information may then be received (at 420) over the one or more signaling channels associated with the first uplink channel, e.g., by the base station. For example, the base station may receive (at 420) transmission power control information, transport combination format information, information associated with a HARQ technique, and/or other information associated with transmissions over the second uplink channel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication between a base station and a mobile unit involving at least one first uplink channel associated with a first protocol and at least one second uplinik channel associated with a second protocol, the first uplinik channel configured to provide data for transmission to the base station over at least one first data channel and signaling information for transmission to the base station over at least one first signaling channel, and the second uplinik channel configured to provide data for transmission to the base station over at least one second data channel and signaling information for transmission to the base station over at least one second signaling channel, the method comprising:
    determining whether the second signaling channel is available;
    transmitting data over said at least one first data channel of the first uplinik channel;
    providing, concurrently with transmitting the data over said at least one first data channel, signaling information associated with the first uplinik channel to the base station over said at least one second signaling channel associated with said at least one second uplinik channel when the second signaling channel associated with said at least one second uplink channel is available; and
    providing, concurrently with transmitting the data over said at least one first data channel, signaling information associated with the first uplink channel to the base station over said at least one first signaling channel when the second signaling channel is not available.

2. The method of claim 1, wherein providing signaling information associated with the first uplink channel comprises providing at least one of transmission format control information, transmit power control information, and hybrid automatic repeat request information.

3. The method of claim 2, wherein providing said signaling information over the second signaling channel associated with said at least one second uplinik channel comprises providing said signaling information over a second signaling channel used to provide at least one of transmission format control information and transmit power control information associated with said at least one second data channel when said at least one second uplinik channel is active.

4. The method of claim 1, comprising mapping said at least one first signaling channel associated with said at least one first uplinik channel to said at least one second signaling channel associated with said at least one second uplinik channel in response to determining that said at least one second uplinik channel is idle.

5. The method of claim 4, wherein mapping said at least one first signaling channel associated with said at least one first uplinik channel comprises mapping at least one of the transport format control information and the RSN information to a transport format control information field in said at least one second signaling channel associated with said at least one second uplink channel.

6. The method of claim 1, comprising determining that said at least one second signaling channel associated with said at least one second uplinik channel is available.

7. The method of claim 6, wherein determining that said at least one second signaling channel associated with said at least one second uplinik channel is available comprises determining that said at least one second uplinik channel is idle.

8. A method of wireless communication between a base station and a mobile unit involving at least one first uplink channel associated with a first protocol and at least one second uplinik channel associated with a second protocol, the first uplink channel configured to provide data for transmission to the base station over at least one first data channel and signaling information for transmission to the base station over at least one first signaling channel, and the second uplinik channel configured to provide data for transmission to the base station over at least one second data channel and signaling information for transmission to the base station over at least one second signaling channel, the method comprising:

receiving data over said at least one first data channel of the first uplink channel;

receiving, concurrently with receiving the data over said at least one first data channel, signaling information associated with the first uplink channel over said at least one second signaling channel associated with said at least one second uplink channel when said at least one second signaling channel associated with said at least one second uplink channel is available because said at least one second uplink channel is idle; and receiving, concurrently with transmitting the data over said at least one first data channel, signaling information associated with the first uplink channel over said at least one first signaling channel when the second signaling channel is not available because said at least one second uplinik channel is in use.

9. The method of claim 8, wherein receiving signaling information associated with the first uplinik channel comprises receiving at least one of transmission format control information, transmit power control information, and hybrid automatic repeat request information.

10. The method of claim 9, wherein receiving said signaling information over said at least one second signaling channel associated with said at least one second uplinik channel comprises receiving said signaling information over at least one second signaling channel used to provide at least one of transmission format control information and transmit power control information associated with the second uplinik channel when the second uplinik channel is active.

11. The method of claim 8, comprising decoding information received over the first uplink channel based on the signaling information provided over said at least one second signaling channel associated with said at least one second uplink channel.

12. The method of claim 8, comprising determining that said at least one second signaling channel associated with said at least one second uplinik channel is available.

13. The method of claim 12, wherein determining that said at least one second signaling channel associated with said at least one second uplinik channel is available comprises determining that said at least one second uplinik channel is idle.

* * * * *